United States Patent [19]

Aoki

[11] Patent Number: 4,859,170

[45] Date of Patent: Aug. 22, 1989

[54] CLAMPING DEVICE FOR A BLOW MOLD

[76] Inventor: Katashi Aoki, c/o Room No. 208, Yotsuya Attorneys at Law Building, 13, Samoncho, Shinjuku-ku, Tokyo, Japan

[21] Appl. No.: 263,541

[22] Filed: Oct. 27, 1988

[30] Foreign Application Priority Data

Oct. 27, 1987 [JP] Japan .......................... 62-271274

[51] Int. Cl.⁴ ............................................. B29C 49/56
[52] U.S. Cl. ......................... 425/450.1; 425/451.9; 425/538; 425/541
[58] Field of Search ............... 425/450.1, 538, 541, 425/522, 589, 595, 451.2, 451.9

[56] References Cited

U.S. PATENT DOCUMENTS

| | | | |
|---|---|---|---|
| 2,792,591 | 5/1957 | Cardot et al. | 425/538 X |
| 3,063,092 | 11/1962 | Fischer | 425/538 X |
| 3,068,511 | 12/1962 | Ahlbeck et al. | 425/538 X |
| 3,880,565 | 4/1975 | Barr et al. | 425/450.1 X |

FOREIGN PATENT DOCUMENTS 59-67020 4/1984 Japan .................................. 425/541
60-96436 5/1985 Japan .................................. 425/541

Primary Examiner—Richard L. Chiesa
Attorney, Agent, or Firm—Ostrolenk, Faber, Gerb & Soffen

[57] ABSTRACT

This invention relates, in a clamping device in which two sets of clamping plates, each set of which comprises a pair, are provided between a pair of fixed plates on a base plate connected by tie bars passing through the tie bars, blow molds in the form of a split mold are mounted on each set of clamping plates and two sets of blow molds are arranged open- and closably between the fixed plates, and a plurality of external clamping cylinders are provided in position of both the fixed plates, a clamping device for blow molds wherein a small hydraulic cylinder whose ram stroke is very short is employed as a clamping cylinder, a plurality of such small hydraulic cylinders are disposed between blow molds arranged in two rows and between the blow molds and fixed plates, and an opening and closing cylinder is disposed between the clamping plates, whereby the opening and closing and clamping of each of the blow molds are carried out.

2 Claims, 2 Drawing Sheets

CLAMPING DEVICE FOR A BLOW MOLD

BACKGROUND OF THE INVENTION

(1) Field of the Invention

This invention relates to a clamping device having two blow molds each comprising a split mold in a back-to-back relation, said blow molds capable of being clamped simultaneously by clamping cylinders respectively externally and internally provided.

(2) Prior Art

A clamping device capable of simultaneously clamping two blow molds arranged in a back-to-back relation is described in Japanese Patent Laid-Open Nos. 59-67020 and 60-96436. These known clamping devices have a construction in which opening and closing of a mold is also carried out by a clamping cylinder, which inevitably requires a rod for alternately connecting split molds or a rod for alternately connecting a split mold and a clamping plate.

The above-described conventional devices have are suffered from problems in that since the opening and closing of a mold is carried out by the clamping cylinder, the opening and closing speed is slow; in the former, a blow mold and a clamping ram are connected to a mold mounting plate provided in the central portion and the inside of the mold is received by a spacer, and therefore, as the number of cavities increases to lengthen the blow mold, both sides of the blow mold tend to be flexed due to the internal pressure; and in the blow mold, parting lines remarkably appear on the sides of a molded article to impair the product value of the molded article.

The latter has a construction in which a blow mold is mounted on a clamping plate inserted through tie bars provided on a fixed plate, and the blow mold is clamped with the clamping plate. Therefore, a flexure due to the internal pressure is hard to occur but a number of clamping plates are required, and as a result an opening and closing space becomes necessary, and therefore, the clamping device becomes large as compared with the former, posing a new problem in that mounting of the clamping device on a molding machine is subjected to limitation.

SUMMARY OF THE INVENTION

This invention has been achieved in order to solve the above-described problems noted above with respect to prior art. It is an object of this invention to provide a new clamping device for a blow mold in which a small hydraulic cylinder whose ram stroke is extremely small is employed as a clamping cylinder, a number of such small hydraulic cylinders are disposed between blow molds arranged in two rows and between the blow molds and a fixed plate, whereby the blow molds are powerfully clamped directly from inside and outside so that even if the number of cavities increases, the blow molds are not flexed.

It is a further object of this invention to provide a new clamping device for a mold in which each blow mold can be opened and closed by an opening and closing cylinder disposed between clamping plates whereby the opening and closing speed is higher than the case where opening and closing is carried out by the clamping cylinder.

It is another object of this invention to provide a new clamping device for a blow mold in which despite all clamping cylinders are disposed internally of a fixed plate, the length of the clamping device is made shorter than that of prior art devices, and even if the number of cavities increases, the device can be manufactured in the compact form.

For achieving the aforementioned objects, the present invention provides a clamping device in which two sets of clamping plates, one set of which comprises a pair, are provided between a pair of fixed plates on a base plate connected by tie bars passing through said tie bars, blow molds in the form of a split mold are mounted on each set of clamping plates and two sets of blow molds are arranged between the fixed plates so that they may be opened and closed, and a plurality of external clamping cylinders are provided in position of both the fixed plates, the improvement wherein an opening and closing cylinder is provided between each set of clamping plates, a supporting device is movably up and down on the underside of a base plate, said supporting device being provided with a central plate extending through said base plate and being interposed between each fixed plate and the clamping plate, and a plurality of internal clamping cylinders acting on both blow molds on said central plate and a plurality of relay rams on both side plates are provided corresponding to said external clamping cylinders, thereby overcoming the above-described problems as noted with respect to prior art.

In the clamping device as described above, when the supporting device is moved upward after two sets of blow molds have been closed by the opening and closing cylinder, the central plate extending through the base plate is positioned between the clamping plates of two sets of blow molds, and at the same time, the side plate is positioned between the fixed plate and the clamping plate of each blow mold.

After both the blow molds have been closed, and when the external clamping cylinder and the internal clamping cylinder are actuated, the external clamping cylinder presses the blow molds through the relay ram, and the internal clamping cylinder directly passes the blow molds to simultaneously and powerfully clamp two sets of blow molds.

The operation of these internal and external clamping cylinders are stopped to return the rams of both the clamping cylinders to their original position, after which the supporting device is moved downward to return the central plate and both the side plates to their original position. Then, an open space is formed between each clamping plate and the fixed plate. In such as a state, when the opening and closing cylinder is actuated in an opening direction, the two sets of blow molds are simultaneously opened internally and externally.

BRIEF DESCRIPTION OF THE DRAWINGS

The drawings show one embodiment of a clamping device for a blow mold according to this invention, in which.

DESCRIPTION OF THE PREFERRED EMBODIMENTS

Figure 1:
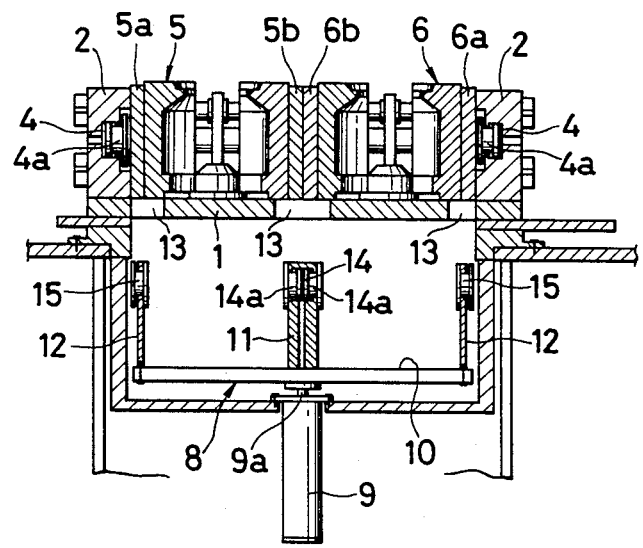
FIG. 1 is a longitudinal sectional view when the mold is opened.
Figure 2:
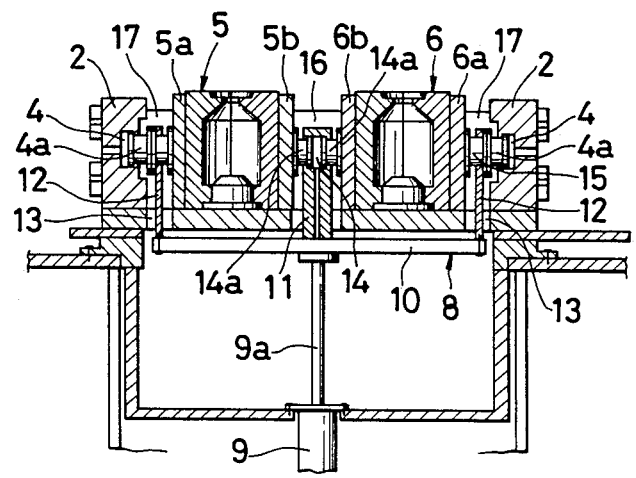
FIG. 2 is a longitudinal sectional view when the mold is clamped.

In the Figure, a base plate indicated at 1 has fixed plates 2 and 2 on opposite sides on the upper surface thereof. These fixed plates 2 and 2 are connected by parallel tie bars 3 and 3 arranged up and down on the side thereof. Internally of the fixed plates 2 and 2, three external clamping cylinders 4 are embedded laterally at regular intervals with rams 4a directed inwardly.

Four clamping plates 5a, 5b and 6a, 6b receiving two sets of blow molds 5 and 6, respectively, are movably inserted into said tie bars 3 and 3, and split molds forming four blowing cavities are mounted on these clamping plates.

An opening and closing cylinder indicated at 7 is positioned between said tie bars 3 and 3, and the cylinder is secured to the tie bars and arranged on both sides of the pair of clamping plates. This opening and closing cylinder 7 has on both ends thereof simultaneously-operated piston rods 7a and 7a. The piston rods 7a and 7a are connected to each set of clamping plates for each opening and closing cylinder so that two sets of blow molds 5 and 6 can be individually or simultaneously opened and closed.

A supporting device 8 is provided on the underside of the base plate 1 so that the supporting device 8 may be moved up and down by a vertically moving cylinder 9. This supporting device 8 comprises a seat plate 10 connected to a piston rod 9a of the vertically moving cylinder 9, a central plate 11 at a height as required provided on the seat plate and both side plates 12 and 12, the central plate 11 being positioned between clamping plates 5b and 6b of two sets of blow molds 5 and 6, through through-holes 13 bored in position of the base plate, the side plates 12 and 12 being positioned between the fixed plate 2 and the clamping plate 5a or 6a.

The central plate 11 is provided an internal clamping cylinder 14 provided with a pair of rams 14a and 14a, and the side plates 12 and 12 are provided with relay rams 15 and 15 together with return springs. These internal clamping cylinder 14 and the relay rams 15 and 15 are arranged in position corresponding to the external clamping cylinders 4 and 4, whereby in the internal clamping cylinder 14, the ram 14a directly presses the clamping plates 5b and 6b, and the external clamping cylinder 4 presses the clamping plates 5a and 6a through the relay ram 15.

While in the above-described embodiment, the opening and closing cylinder 14 has been secured to the tie bars, it is to be noted that the opening and closing cylinder can be secured over the set of clamping plates at the position of the tie bars.

In the following, the operation of opening and closing and clamping in the above-described clamping device will be described.

Figure 3:
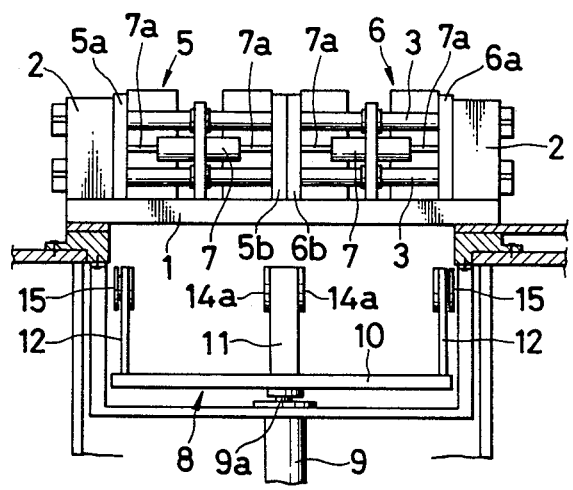
FIG. 3 is a partial longitudinal sectional view when the mold is opened.
Figure 4:
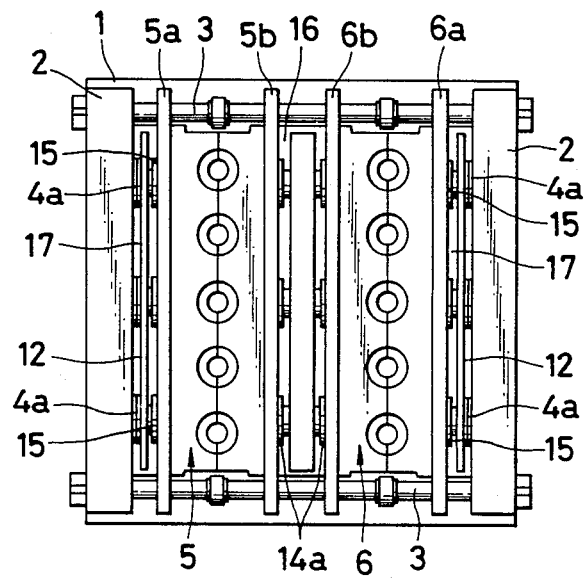
FIG. 4 is a plan view when the mold is clamped.

In the opened state shown in FIGS. 1 and 3, when the opening and closing cylinders 7 and 7 are actuated in a reducing direction, the clamping plates 5a, 5b and 6a, 6b of two sets of blow molds 5 and 6 are drawn toward each other to close the mold. By this closure, opening and closing spaces 16, 17, 17 are formed between the fixed plate 2 and the clamping plates 5a, 6a and between two sets of clamping plates 5b and 6b.

Then, when the supporting device 8 is moved upward under the state wherein each ram 14a of the internal clamping cylinder 14 is reduced, the central plate 11 and both side plates 12, 12 extend through each through-hole 13 of the base plate 1 into the opening and closing spaces 16, 17 and 17.

The upward movement of the supporting device 8 continues till the rams 14a, 14a and relay rams 15, 15 assume the same position as the external clamping cylinders 4, 4 and the vertically moving cylinder 9 is controlled so that the supporting device 8 may automatically stop when it reached that position.

After the central plate 11 and both sides plates 12, 12 have been fed into the opening and closing spaces 16, 17 and 17, the external clamping cylinders 4, 4 and internal clamping cylinder 15 are actuated to extend the rams 4a and 14a. Thereby, the ram 4a presses the clamping plates 5a and 6a through the relay ram 15, and the ram 14a presses the clamping plates 5b and 6b.

By the aforesaid pressing, two sets of blow molds 5 and 6 are powerfully clamped from inside and outside and can sufficiently withstand the internal pressure and become difficult to produce a flexure or the like.

Next, when the blow molds are opened after the molding step, the external clamping cylinder 4 and the internal clamping cylinder 14 are actuated in the direction opposite the case where the molds are clamped to reduce the rams 4a and 14a. Thereby, the pressing force applied to the two sets of blow molds 5 and 6 is removed and the resistance to the downward movement of the supporting device 8 disappears, and therefore, the vertically moving cylinder 9 is actuated in a reducing direction to draw out the central plate 11 and both side plates 12 towards the underside of the base plate 1. Thereby, the opening and closing spaces 16, 17 and 17 are again secured, and when the opening and closing cylinders 7 and 7 are actuated in a reducing direction, two sets of blow molds 5 and 6 are opened till the clamping plates come into contact with each other or contact with the fixed plate 2 to open the molds.

As will be apparent from the above-described embodiment, since in this invention, the clamping cylinders 4 and 14 are provided between two sets of blow molds 5 and 6 and between the blow mold 5 and the fixed plate 2, no molding opening and closing rod is required which has been inevitably required. Furthermore, the internal clamping cylinder 14 acting on both the blow molds is provided in the opening and closing space 16 between the two sets of blow molds formed after mold closure, and the blow molds 5 and 6 are simultaneously powerfully clamped from inside and outside by the plurality of clamping cylinders 4 and 14. Therefore, even if the number of cavities increases, the blow molds are not flexed by the internal pressure.

Moreover, the relay ram 15 is provided on both side plates 12 of the supporting device 8, and the ram 4a of the external clamping cylinder 4 on the fixed plate side is made to act on the blow molds 5 and 6 through the relay ram 12. Therefore, the ram stroke of the external clamping cylinder 4 will suffice to be short, and the hydraulic cylinder of short stroke can be used to effect powerful clamping, and in addition, the length of the clamping cylinder as a whole can be shortened. Furthermore, four clamping plates will suffice, and the opening and closing cylinder 7 can be disposed between the tie bars 3 and 3 and provided on the clamping plate. Therefore, the length of the clamping device can be shortened despite a number of clamping cylinders are present internally of the fixed plate, and even if the number of cavities increases, the device can be manufactured compactly.

What is claimed is:

1. In a clamping device in which two sets of clamping plates, one set of which comprises a pair, are provided between a pair of fixed plates on a base plate connected by tie bars passing through said tie bars, blow molds in the form of a split mold are mounted on each set of clamping plates and two sets of blow molds are arranged between the fixed plates so that the blow molds may be opened and closed, and a plurality of external clamping cylinders are provided in a position in both the fixed plates, said clamping device for said blow molds comprising a supporting device with a central plate and two side plates provided on a seat plate and characterized in that said central plate extends through said base plate and is interposed between two sets of the clamping plates and both the side plates are interposed between the fixed plate and the clamping plate, the clamping device further comprising said supporting device being movable in a vertical direction on the underside of the base plate, a plurality of internal clamping cylinders provided on opposite sides of the central plate of the supporting device corresponding to said external clamping cylinder, a plurality of relay rams provided extending through both the side plates of the supporting device and corresponding to said external clamping cylinder, and an opening and closing cylinder is provided over each set of clamping plates.

2. The clamping device for blow molds according to claim 1, wherein said opening and closing cylinder has on both ends thereof simultaneously-operated piston rods, and the piston rods are connected to two sets of said clamping plates, respectively, with the cylinder secured to the tie bars.

* * * * *